Patented Apr. 5, 1938

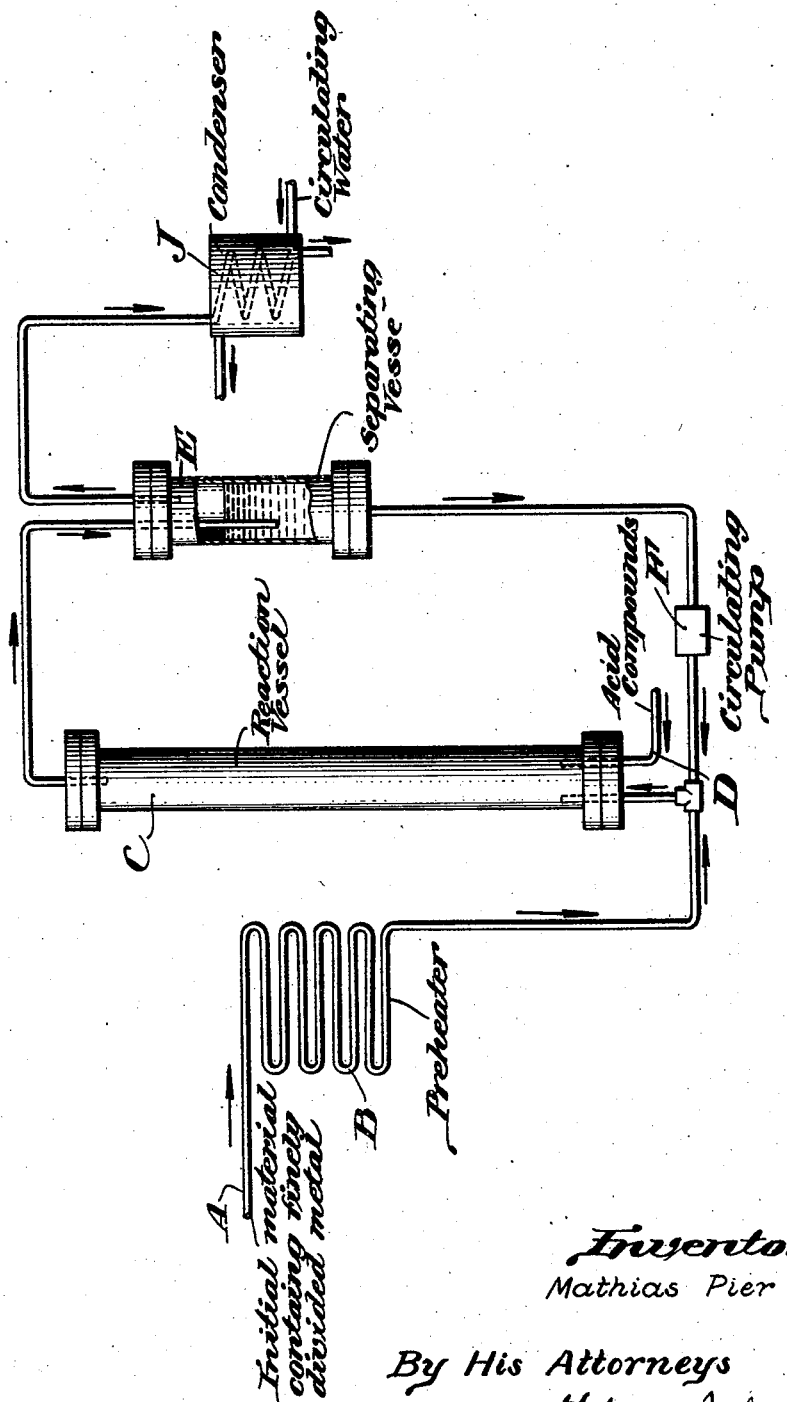

2,113,162

UNITED STATES PATENT OFFICE 2,113,162

SPLITTING OF HYDROCARBONS

Mathias Pier, Heidelberg, Germany, assignor to I. G. Farbenindustrie Aktiengesellschaft, Frankfort-on-the-Main, Germany Application June 11, 1935, Serial No. 26,095 In Germany June 14, 1934

2 Claims. (Cl. 196—52)

The present invention relates to the splitting of hydrocarbons of higher boiling point into those of lower boiling point.

I have found that good yields of products of lower boiling point are obtained from hydrocarbons of higher boiling point by splitting when the splitting is carried out in the presence of finely grained metals of the 2nd or the 4th groups of the periodic system in particular magnesium, zinc, strontium, mercury, titanium, germanium, tin and lead, or of the iron group, in particular finely dispersed in the substances to be treated, as catalysts at temperatures above 350° C. and advantageously under increased pressure, as for example 40 atmospheres or more, acid substances, in particular acids, as for example halogen hydracids or substances forming the same under the reaction conditions, being also added to the initial materials, preferably during and/or after the preheating in one or more stages. The grains of the metals usually have a size below 1 millimeter and preferably below 0.5 millimeter.

Zinc, magnesium or iron may be employed with particular advantage as comminuted, finely divided metals but also cobalt, nickel, titanium, silicon or tin and the other members of the aforesaid class of metals are useful. The catalysts may also be applied to carriers, as for example activated lignite small coke which has been pretreated with acid, charcoal or active silica. The catalysts are added to the initial material in a finely divided state. It is preferable to use amounts of from 0.1 to 5 per cent or more of the weight of the material to be treated. The initial material mixed with the catalyst is then heated to temperatures of from 350° to 700° C., preferably from 400° to 550° C., preferably in a gas heated coil system. The reacting materials are then passed into the reaction chamber the diameter of which is preferably greater than that of the heating coil.

The initial material may be any kind of higher boiling hydrocarbon oils, such as tars, mineral oils from any source, destructive hydrogenation products of coals, tars or mineral oils, or fractions of the same, advantageously heavy oils or middle oils. By the above described process heavy oils may be converted into middle oils or light oils, as for example kerosene, or gas oil into benzine, or any conversion forming lower boiling hydrocarbons from higher boiling hydrocarbons may be effected.

It is especially advantageous to add the acid substances to the initial material to be treated only after the latter has acquired a high temperature, preferably a temperature of more than 350° C. As acid substances come into question substances having an acid reaction under the conditions of working (which includes substances giving rise to the formation of compounds having an acid reaction under the said conditions of working). Examples of the said acid substances which may be employed in the process according to the present invention are halogens, such as chlorine, bromine or iodine, or the hydrogen compounds of the same, or other acids, such as sulphuric acid, sulphurous acid, phosphoric acid, nitric acid or organic acids, such as acetic acid or sulphonic acids or readily decomposable metal halides or halides of metalloids, or acid salts, such as acid phosphates or acid sulphates or bisulphites, or organic halogen compounds, such as carbon tetrachloride or ethylene dichloride or methyl chloride or ethyl chloride or the corresponding bromides or halogen derivatives of aromatic hydrocarbons, such as monochlorobenzene or benzyl chloride. Of particular advantage are the halogens, halogen hydrides and substances giving rise to the formation of halogen hydrides, under the conditions of working, as for example the organic halogen compounds, and of these acid substances which are hereinafter collectively referred to as substances, comprising a halogen, which act as an acid under the conditions of working, are preferred chlorine, hydrogen chloride and the corresponding substances giving rise to the formation of hydrogen chloride which are collectively referred to as substances, comprising chlorine, which act as an acid under the conditions of working. The addition of these substances may be made during the preheating, as for example at 350°, 400°, or 450° C., or at still higher temperatures, or after the preheating, for example before entry into the reaction vessel adjoining the preheating devices. The addition may also be made in several stages at different temperatures. The amount added is from 0.05 to 3 per cent or more.

The initial materials are treated under the said conditions for a time sufficient to effect a substantial splitting. This time usually ranges between some minutes, as for example 5 minutes, to about one hour, but may also be shorter or longer. At higher temperatures the duration of treatment selected is shorter than at lower temperatures.

The accompanying drawing illustrates an arrangement suitable for carrying out the invention. The hydrocarbon oil to be treated together with the finely divided catalytic metal is introduced into a preheater B through A and passes to a reactor C. While in the reactor, the hydrocarbon oil is subjected to the action of acid compounds introduced at D. The vaporous products from the reaction are drawn off at the top of the reactor and passed to separating vessel E, the condensate being recycled by pump F to the reactor. The products which do not condense in the separator are conducted to the condenser J.

The following example will further illustrate the nature of this invention but the invention is not restricted to this example.

Example

A topped oil having a specific gravity of 0.935 and containing 6 per cent of constituents boiling up to 325° C. is mixed with 0.2 per cent of finely divided iron obtained by the reduction of iron oxide. The oil is heated to 450° C. in a coil system under a pressure of 50 atmospheres and then led into a reaction vessel of greater diameter than the heating coil. Before entry into the reaction vessel, 0.1 per cent of carbon tetrachloride is added to the oil. The products are led into a separator under a pressure of 5 atmospheres. 32 per cent of an oil of high boiling point thus separate; this oil may be used as a heating oil. The vaporous products, leaving in an amount of 68 per cent, are fractionally condensed. 28 per cent of benzine and 40 per cent of middle oil are obtained.

What I claim is:—

1. A process for treating liquid hydrocarbon mixtures to produce a splitting of the hydrocarbons of said mixtures into lower boiling hydrocarbons, which comprises adding to said mixtures from .1 to not more than 5 per cent with reference to said mixtures of a catalyst comprising a single finely grained solid metal having the capacity of appearing in the bivalent form while its valency is never smaller than 2 and never greater than 4, selected from the class consisting of magnesium, zinc and iron, preheating said mixtures in the presence of said catalyst, passing said mixtures and said catalyst to a reactor and subjecting said mixtures in the presence of said catalyst in said reactor to a temperature of from about 400 to 550° C. for a period of about 5 minutes to an hour in the absence of added hydrogen and in the presence of an addition to said mixtures, subsequent to the preheating step, of from .05 to not more than 3% of an organic halogen compound which under the conditions of working is capable of splitting off halogen or halogen hydrides.

2. The process as defined in claim 1, wherein the liquid hydrocarbon mixture is a topped oil containing about 6% of constituents boiling up to 325° C., wherein said finely grained solid metal is iron which is employed in an amount of .2% of the oil, wherein the temperature is about 450° C. and wherein the organic halogen compound is carbon tetrachloride which is employed in an amount of .1%.

MATHIAS PIER.